United States Patent
Shoesmith

(10) Patent No.: US 9,353,686 B2
(45) Date of Patent: May 31, 2016

(54) METHOD AND APPARATUS FOR GENERATING MOTIVE POWER

(71) Applicant: ROLLS-ROYCE PLC, London (GB)

(72) Inventor: John Phillip Shoesmith, Belper (GB)

(73) Assignee: ROLLS-ROYCE PLC, London (GB)

( * ) Notice: Subject to any disclaimer, the term of this patent is extended or adjusted under 35 U.S.C. 154(b) by 441 days.

(21) Appl. No.: 13/888,969

(22) Filed: May 7, 2013

(65) Prior Publication Data

US 2013/0298567 A1 Nov. 14, 2013

(30) Foreign Application Priority Data

May 10, 2012 (GB) .................................. 1208189.9

(51) Int. Cl.
*F02C 7/12* (2006.01)
*F02C 7/16* (2006.01)
*F02C 6/00* (2006.01)

(52) U.S. Cl.
CPC ... *F02C 7/12* (2013.01); *F02C 6/00* (2013.01); *F02C 7/16* (2013.01)

(58) Field of Classification Search
CPC ................. F02C 6/00; F02C 7/12; F02C 7/16
See application file for complete search history.

(56) References Cited

U.S. PATENT DOCUMENTS

| | | | |
|---|---|---|---|
| 6,481,978 B2 * | 11/2002 | Zamalis | F01D 21/00 184/6.11 |
| 2008/0302317 A1 | 12/2008 | Brown | |
| 2012/0036866 A1 * | 2/2012 | Finney | F02C 9/263 60/801 |

FOREIGN PATENT DOCUMENTS

| | | |
|---|---|---|
| CN | 202103764 U | 1/2012 |
| JP | A-57-117739 | 7/1982 |
| JP | A-63-15318 | 1/1988 |
| JP | A-2-32298 | 2/1990 |
| JP | A-4-172293 | 6/1992 |
| JP | A-2004-363286 | 12/2004 |

OTHER PUBLICATIONS

Sep. 6, 2012 Search Report issued in British Application No. GB1208189.9.

* cited by examiner

*Primary Examiner* — Arun Goyal
(74) *Attorney, Agent, or Firm* — Oliff PLC

(57) ABSTRACT

A cooling medium supply apparatus has a sensing means and a cooling medium pump mechanism which is powered by a gas turbine engine assembly. The gas turbine engine assembly is self-contained with a fuel supply, an ignition system and a starting system. The sensing means monitors the presence of a primary supply of a cooling medium, and on detecting a loss of the primary supply, actuates the gas turbine assembly to provide a secondary supply of the cooling medium.

6 Claims, 2 Drawing Sheets

METHOD AND APPARATUS FOR GENERATING MOTIVE POWER

This invention claims the benefit of UK Patent Application No. 1208189.9, filed on 10 May 2012, which is hereby incorporated herein in its entirety.

FIELD OF THE INVENTION

The present invention relates to a cooling medium supply system and particularly, but not exclusively, to a cooling medium supply system for emergency applications powered by a gas turbine engine, together with a method of operating such a supply system.

BACKGROUND TO THE INVENTION

Nuclear reactors can be used to power electricity generating plant machinery, usually in the form of the generation of steam to power steam turbines. The steam turbines can then be used to drive turbo-alternators for electricity generation.

In such arrangements there is a need to control the dissipation of excess or waste heat produced by the nuclear reactor. This is usually achieved by the circulation of cooling water feeds through the reactor assembly.

While effective at the dissipation of heat, such cooling water systems must be resistant to leaks and power outages. Pumps are typically used to inject water into the coolant circuit to compensate for losses and leakage. These pumps are required to be capable of operating in the absence of external power, such as during electricity supply outages.

It is known to use electrically powered coolant circulation and make-up pumps. In such instances, the electrical power supplies need to be of high integrity. This in turn requires the presence of a high integrity back-up electrical supply, typically in the form of a diesel engine powered electricity generating unit.

Such generating units have many potential causes of failure including inter alia loss of engine lubricant or coolant, fuel supply exhaustion, fuel contamination, filter blockages, ignition failure, enclosure ventilation failure and control system failures.

As a result, diesel engine powered generating sets require testing at regular intervals, often as part of a routine maintenance plan. The requirement for regular maintenance and testing can result in problems caused by human error.

Typically diesel engine powered generating sets are configured to generate electricity which is used to energise bus bars and then operate electrically powered pumps. These electrical systems may also be a further source of unreliability.

An alternative approach is to use a diesel engine powered back-up coolant circulation pump. However, such arrangements have similar drawbacks to those outlined above for diesel engine powered generating sets.

STATEMENTS OF INVENTION

According to a first aspect of the present invention there is provided a cooling medium supply apparatus comprising:
 a cooling medium pump mechanism in fluid communication with a cooling medium;
 a first cooling medium delivery means;
 a second cooling medium delivery means; and
 a sensing means configured to provide a signal indicative of a loss of supply of the cooling medium through the first cooling medium delivery means;

wherein, in response to the signal, the cooling medium pump mechanism is operable to deliver the cooling medium through the second cooling medium delivery means.

The cooling medium supply apparatus is arranged so as to provide a seamless transition between a primary supply of a cooling medium and a secondary supply of the cooling medium in the event of a failure of the provision of the primary supply of cooling medium.

This makes the apparatus more reliable than conventional cooling medium pumping systems, which in turn may eliminate the requirement for continued maintenance and testing of such systems.

Optionally, the apparatus further comprises a self-contained gas turbine engine system operatively connected to the cooling medium pump mechanism, wherein, on receipt of the signal by the engine system, the engine system is activated to thereby deliver the cooling medium through the second cooling medium delivery means.

A gas turbine engine has fewer moving parts than a diesel internal combustion engine. This means that the use of a gas turbine engine to power the cooling medium pump mechanism can make the cooling medium supply apparatus more reliable than conventional cooling medium pumping systems.

Optionally, the gas turbine engine system comprises:
 a gas turbine engine;
 a self-contained fuel supply;
 an ignition system; and
 a starting system,
wherein the fuel supply comprises a pressurised fuel container, an internal pressure of the container being greater than an external pressure of the container.

The gas turbine engine system is entirely self-contained and includes all the necessary elements for independent standalone operation. This enables the engine to be activated by a single command issued by a user.

The self-contained nature of the engine system makes the installation of the cooling medium supply apparatus of the invention simple and straightforward, since there is no requirement to provide external services, such as a fuel or electrical supply.

Optionally, the fuel container comprises a pressure generating device that, on receipt of the signal by the engine system, is configured to cause the internal pressure to be greater than the external pressure.

The use of a pressure generating device to pressurise the fuel container enables the fuel to be supplied to the engine at the required volumetric flow rate without the need for a separate, powered fuel pumping system. This makes the apparatus simpler and more reliable than conventional cooling medium pumping systems.

Optionally, the starting system comprises a pressurised gas reservoir and a gas release valve, wherein receipt of the signal by the engine system causes actuation of the release valve which causes the pressurised gas to be directed into an intake of the gas turbine engine to thereby cause a rotational speed of the gas turbine engine to increase to a starting value.

Similarly, the use of a pressurised gas to start the engine eliminates the need for complex electrical starting motors, electrical power supplies and the associated control hardware. This also makes the apparatus simpler and more reliable than conventional cooling medium pumping systems.

According to a second aspect of the present invention there is provided a method of delivering a cooling medium supply to a machine, the method comprising the steps of:
 (a) sensing a loss of supply of a cooling medium to the machine through a first cooling medium delivery means;

(b) generating a signal indicative of the loss of supply of the cooling medium; and (c) in response to the signal, activating a cooling medium pump mechanism to deliver the cooling medium to the machine through the second cooling medium delivery means.

Optionally, the machine comprises a gas turbine engine, a self-contained fuel supply, an ignition system and a starting system, the gas turbine engine being operatively connected to the cooling medium pump mechanism, and step (c) of the method comprises the steps of:

(d) receipt of the signal by the machine;

(e) in response to the signal, supplying the engine with a fuel from a pressurised fuel container;

(f) activating the starting system to thereby activate the engine to thereby cause the cooling medium pump mechanism to deliver the cooling medium to the machine through the second cooling medium delivery means; and (g) operating the engine until the fuel supply is exhausted.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which.

It is noted that the drawings are not to scale. The drawings are intended to depict only a typical aspect of the invention, and therefore should not be considered as limiting the scope of the invention.

DETAILED DESCRIPTION

Figure 1:
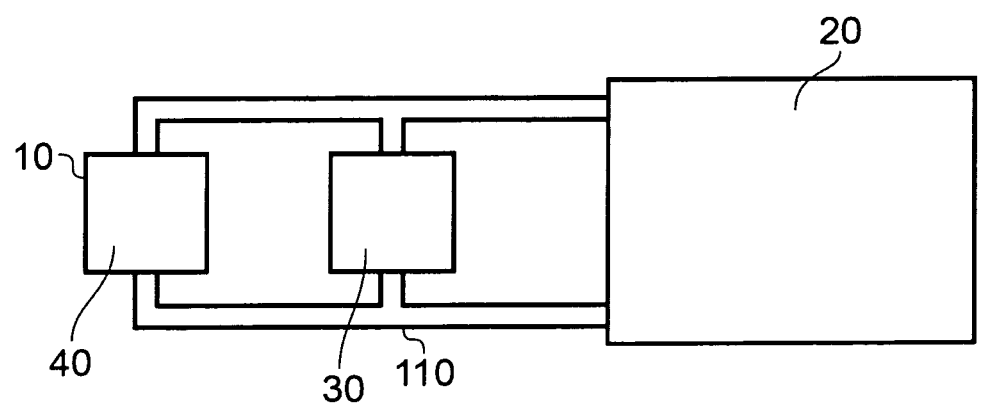
FIG. 1 shows a schematic arrangement of a cooling medium supply system according to the present invention as applied to a machine.
Figure 2:
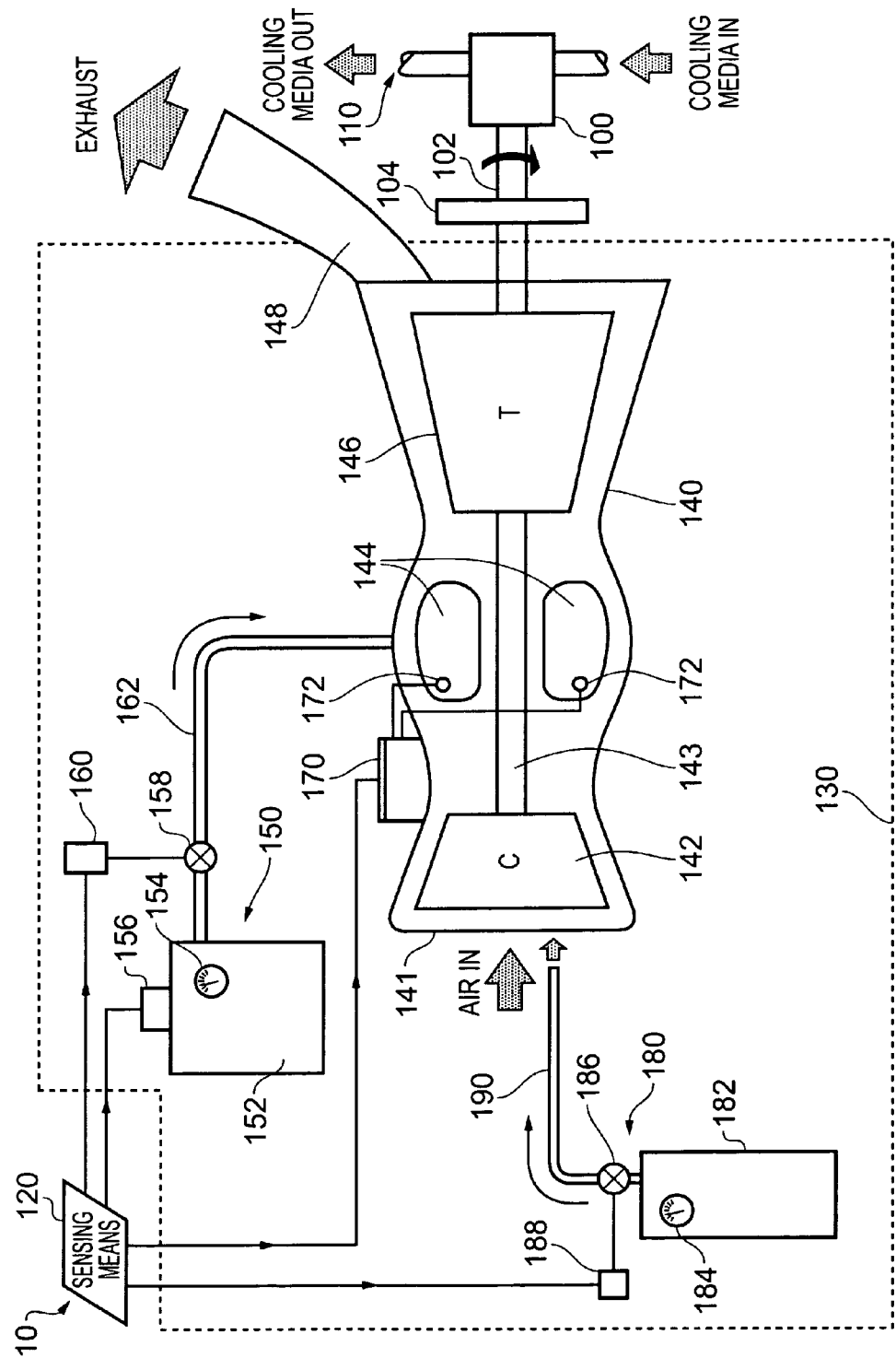
FIG. 2 shows a schematic arrangement of a cooling medium supply apparatus according to the present invention.

Referring to FIGS. 1 and 2, a cooling medium supply apparatus according to an embodiment of the invention is designated generally by the reference numeral 10.

A machine 20 is provided with a first cooling medium delivery means 30 and a second cooling medium delivery means 40 for the circulation of a cooling medium 110 through the machine 20. In this embodiment of the invention, the second cooling medium delivery means 40 takes the form of the cooling medium supply apparatus 10.

The cooling medium supply apparatus 10 comprises a cooling medium pump mechanism 100 which is in fluid communication with a cooling medium 110, and a sensing means 120.

The sensing means 120 monitors a primary supply of the cooling medium 110 and is arranged to provide a signal indicative of a loss of the primary supply of the cooling medium 110. In this embodiment, the sensing means 120 takes the form of a controller which monitors the primary supply of the cooling medium 110.

In this embodiment of the invention, the cooling medium pump mechanism 100 is a conventional industrial liquid pump while the cooling medium 110 takes the form of water. Optionally the water may include various chemical additives, such as, for example, corrosion inhibitors, anti-foam additives and/or viscosity modifiers.

In other embodiments the cooling medium 110 may take the form of another liquid which is suitable for heat conduction applications such as, for example, ethylene glycol.

The cooling medium pump mechanism 100 is operatively connected by a mechanical driveshaft 102 and clutch mechanism 104, to a self-contained gas turbine engine system 130. In other embodiments the cooling medium pump mechanism 100 may be operatively connected to the gas turbine engine system 130 by an alternative power transmission means, such as, for example, a belt or chain drive.

The gas turbine engine system 130 comprises a gas turbine engine 140, a self-contained fuel supply 150, an ignition system 170 and a starting system 180.

In the present embodiment, the gas turbine engine 140 takes the form of a conventional single-shaft, industrial gas turbine engine which is sized to provide a sufficient shaft power output to match the power requirement of the cooling medium pump mechanism 100. The gas turbine engine 140 comprises, in axial flow series, an air intake 141, a compressor 142, a plurality of combustion chambers 144, a turbine 146 and an exhaust assembly 148. The compressor 142 and turbine 146 are connected together by an interconnecting shaft 143.

The fuel supply 150 comprises a sealed container 152 which contains a quantity of fuel. A fuel level gauge 154 is provided on the container 152 to indicate the level status of the container 152 to be deduced by an observer.

The container 152 is connected to the combustion chambers 144 via a fuel supply pipe 162. A fuel flow valve 158, which is actuated by a fuel flow valve actuator 160, is positioned in the fuel supply pipe 162 between the container 152 and the combustion chambers 144. The fuel flow valve actuator 160 is controlled by the sensing means 120.

In the present embodiment, the ignition system 170 comprises a plurality of catalyst elements (not shown) situated within the combustion chambers 144. In an alternative embodiment, the ignition system 170 may comprise a plurality of battery powered ignitor units.

The starting system 180 comprises a gas reservoir 182, containing a quantity of pressurised gas, a gas supply pipe 190, a gas flow valve 186 and a gas flow valve actuator 188. In the present embodiment, the gas is air. However, in alternative embodiments, the gas may be any gas which is capable of supporting combustion of the fuel, such as, for example, a mixture of air and oxygen.

The gas flow valve 186 takes the form of a conventional motorised gas flow valve. Alternatively, a conventional bursting disc may be substituted for the gas flow valve 186.

Still further embodiments of the invention may comprise a starting system 180 which employs a conventional cartridge starter mechanism.

A pressure gauge 184 is provided on the gas reservoir 182 to provide an indication of the gas pressure in the gas reservoir 182.

The gas supply pipe 190 directs a flow of the pressurised gas from the gas reservoir 182 into the intake 141 of the gas turbine engine 140.

In use, the sensing means 120 continually monitors the primary supply of the cooling medium 110. When the sensing means 120 determines there to be a loss of the primary supply of the cooling medium 110, it transmits a first actuating signal to the pressure generating device 156. In response, the pressure generating device 156 then generates a gas pressure in fuel container 152.

The sensing means 120 then transmits a second actuating signal to the fuel flow valve actuator 160, which causes fuel to flow along the fuel supply pipe 162, through the fuel flow valve 158 and into the combustion chambers 144.

At this stage, the sensing means 120 transmits a third actuating signal to the gas flow valve actuator 188 which initiates a flow of the gas into the intake 141 of the gas turbine engine 140. This gas flow causes rotation of the compressor 142 which results in a rotational speed of the gas turbine engine 140 increasing.

When the rotational speed of the gas turbine engine 140 has reached a pre-determined starting threshold value, the sensing means transmits a fourth actuating signal to the ignition system 170 which results in actuation of the gas turbine engine 140.

The gas turbine engine 140 operates in a conventional manner so that air entering the intake 141 is compressed by the compressor 142. The compressed air exhausted from the compressor 142 is directed into the combustion chambers 144 where it is mixed with fuel and the mixture combusted. The resultant hot combustion products then expand through, and thereby drive the turbine 146 before being exhausted through the exhaust 148. The turbine 146 drives the compressor 142 via interconnecting shaft 143.

With the gas turbine engine 140 rotating at its normal operating speed, the clutch mechanism 104 may be actuated to provide a rotational drive to the cooling medium pump mechanism 100. Operation of the cooling medium pump mechanism then provides a secondary flow of the cooling medium 110.

The gas turbine engine 140 operates continuously until the supply of fuel contained in the fuel container 152 is exhausted, at which point the engine stops.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A cooling medium supply apparatus comprising:
    a cooling medium pump mechanism in fluid communication with a cooling medium;
    a self-contained gas turbine engine system operatively connected to the cooling medium pump mechanism and a machine;
    a first cooling medium delivery apparatus;
    a second cooling medium delivery apparatus; and
    a sensor configured to provide a signal indicative of a loss of supply of the cooling medium to the machine through the first cooling medium delivery apparatus;
    wherein, on receipt of the signal by a controller of the machine, the self-contained gas turbine engine system is activated to thereby deliver the cooling medium through the second cooling medium delivery apparatus to the machine.

2. An apparatus as claimed in claim 1, wherein the self-contained gas turbine engine system comprises:
    a gas turbine engine;
    a self-contained fuel supply;
    an ignition system; and
    a starting system,
    wherein the fuel supply comprises a pressurised fuel container, an internal pressure of the container being greater than an external pressure of the container.

3. An apparatus as claimed in claim 2, wherein the fuel container comprises a pressure generating device that, on receipt of the signal by the controller, is configured to cause the internal pressure to be greater than the external pressure.

4. An apparatus as claimed in claim 2, wherein the starting system comprises a pressurised gas reservoir and a gas release valve, wherein receipt of the signal by the controller causes actuation of the release valve which causes the pressurised gas to be directed into an intake of the gas turbine engine to thereby cause a rotational speed of the gas turbine engine to increase to a starting value.

5. A method of delivering a cooling medium supply to a machine, the machine further comprising a gas turbine engine, a self-contained fuel supply, an ignition system and a starting system, the gas turbine engine being operatively connected to the cooling medium pump mechanism, the method comprising the steps of:
    (a) sensing a loss of supply of a cooling medium to the machine through a first cooling medium delivery apparatus:
    (b) generating a signal indicative of the loss of supply of the cooling medium;
    (c) receipt of the signal by a controller;
    (d) in response to the signal, supplying the gas turbine engine with a fuel from a pressurised fuel container;
    (e) activating the starting system to thereby activate the gas turbine engine to thereby cause the cooling medium pump mechanism to deliver the cooling medium to the machine through a second cooling medium delivery apparatus;
    and
    (f) operating the engine until the fuel supply is exhausted.

6. An apparatus as claimed in claim 3, wherein the starting system comprises a pressurised gas reservoir and a gas release valve, wherein receipt of the signal by the controller causes actuation of the release valve which causes the pressurised gas to be directed into an intake of the gas turbine engine to thereby cause a rotational speed of the gas turbine engine to increase to a starting value.

* * * * *